United States Patent [19]

Rhodenbaugh

[11] Patent Number: 4,921,626

[45] Date of Patent: May 1, 1990

[54] GLASS ETCHING COMPOSITION AND METHOD OF MAKING

[75] Inventor: Thomas A. Rhodenbaugh, Cincinnati, Ohio

[73] Assignee: Automark Corporation, Louisville, Ky.

[21] Appl. No.: 397,277

[22] Filed: Aug. 23, 1989

[51] Int. Cl.$^5$ .................... C09K 13/06; C09K 13/08; B44C 1/22; C03C 15/00
[52] U.S. Cl. .................................. 252/79.4; 156/655; 156/663; 252/79.3
[58] Field of Search .................. 252/79.3, 79.4, 142; 156/655, 663

[56] References Cited

U.S. PATENT DOCUMENTS

| | | | |
|---|---|---|---|
| 2,067,925 | 1/1937 | Clayton-Kennedy | 156/663 X |
| 4,316,766 | 2/1982 | Levin et al. | 156/663 X |
| 4,585,514 | 4/1986 | Scallan | 156/663 X |

Primary Examiner—William A. Powell
Attorney, Agent, or Firm—Charles G. Lamb

[57] ABSTRACT

A glass etching composition comprising ammonium bifluoride, xanthum gum, water and propylene glycol, and, a method of preparation. The composition is particularly useful in etching identification marks, such as serial numbers, in automobile window glass.

9 Claims, No Drawings

GLASS ETCHING COMPOSITION AND METHOD OF MAKING

BACKGROUND OF THE INVENTION

The present invention relates to etching compositions and methods for preparation, and more particularly to an etching composition for glass and a method of making the glass etching composition.

Various etching compositions are known. For example, U.S. Patent No. 3,616,098 teaches a glass composition containing ammonium bifluoride crystals, hydrofluoric acid, potassium fluoride and a solvent system containing water and diethylene glycol or propylene glycol. U.S. Patent No. 4,376,673 teaches a composition for etching dental porcelain which includes a buffered solution containing an alkali metal fluoride such as sodium fluoride dissolved in a dilute weak acid, such as phosphoric acid, lactic acid, acetic acid and citric acid, to provide trace amounts of hydrogen fluoride in the solution. U.S. Patent No 4,517,106 teaches an etching solution particularly adopted to etch integrated circuit components including ammonium bifluoride and an organic solvent such as ethylene glycol.

SUMMARY OF THE INVENTION

The present invention provides a glass etching composition including from about 16% to about 30% b weight of ammonium bifluoride as the etching agent, from about 2% to about 4% by weight of xanthum gum as a viscosity control agent, from about 45% to about 60% by weight of water as a solubilizinq agent, and about 20% to about 24% by weight of propylene glycol as a dispersing and wetting agent.

The present invention also provides a process for making a glass etching composition comprising the steps of adding ammonium bifluoride to water in a first vessel under agitation conditions, agitating the ammonium bifluoride and water mixture until the ammonium bifluoride is completely solubilized, adding xanthum gum to propylene glycol in a second vessel under agitation conditions, agitating the xanthum gum and propylene glycol mixture until the xanthum gum is suspended or dispersed, recirculating the ammonium bifluoride-water solution from the bottom region of the first vessel to a high elevation in the first vessel under agitation conditions and simultaneously therewith, pumping the xanthum gum-propylene glycol solution from the second vessel to the first vessel, said reculating being under agitation conditions, continuing the circulation and agitation until the mixture is homogenous.

The glass etching composition of the present invention includes an inorganic salt, preferrably ammonium bifluoride, propylene glycol, a natural gum, preferrably xanthum gum, and water.

The preferred glass etching composition is a homogenous mixture including from about 16 percent to about 30 percent by weight ammonium bifluoride, from about 20 percent to about 24 by weight propylene glycol, from about 2 percent to about 4 percent by weight xanthum gum, and from about 45 percent to about 60 percent by weight water. Even more preferably, the glass etching composition comprises about 22 percent by weight ammonium bifluoride, 24 percent by weight propylene glycol, 3 to 4 percent by weight xanthum gum, and 50 to 57 percent by weight water.

In a glass etching composition of the present invention ammonium bifluoride is the preferred active ingredient which etches the glass due primarily to the release of hydrofluoric acid.

In a glass etching composition of the present invention propylene glycol is the preferred dispersing and wetting agent to provide for the combining of the other ingredients. However, it has been found that other dispersing and wetting agents may also be used, such as, for example hexylene, ethylene glycol, and the like.

Xanthum gum is a preferred viscosity increase in the present invention, but other compounds, such as, guar gum, and the like have also been found to be compatible.

In addition, if needed, trace amounts of phosphoric acid, citric acid and the like can be included to adjust the pH of the etching composition downwardly. Preferably, the etching composition has a pH of less than 6.0 and preferably about 5.0. An additional effect of the preferred phosphoric acid is that it further increases the release of hydrofluoric acid from the ammonium bifluoride. Furthermore, no more than about 2 percent by weight of phosphoric acid is added to the etching composition.

A more comprehensive understanding of the invention can be obtained by considering the following examples. However, it should be understood that the examples are not intended to be unduly limitative of the invention.

EXAMPLES I-VIII

The following examples demonstrate the procedure that was followed in preparing a glass etching composition and then utilizing the composition for etching glass windows of automobiles.

EXAMPLE I

In the process of making the glass etching composition, 55.0 gallons of water was put into a first vessel having a conical bottom portion and a cylindrical upper portion and agitated with a mechanical agitator having a lower set of blades which sweep the conical bottom portion and an upper set of blade which sweep the cylindrical upper portion at a first rate which minimized the creation of vortices while causing agitation in the water. While the water was being agitated, 280 pounds of crystalline ammonium bifluoride was added to the water. Agitation of the ammonium bifluoride/water mixture was continued until the crystalline ammonium bifluoride was dissolved in the water forming a homogenous solution. The water was at a temperature of from about 30 F. to about 60 F. during the agitation.

After the ammonium bifluoride was solubulized in the water, the agitation was decreased to a second rate allowing encapsulated air to escape.

Also in the process of making the glass composition, 230 pounds of propylene glycol was put into a second vessel and agitated with a mechanical agitator having sets of blades at a rate sufficient to create vortices and a higher shear than was generated in the water-ammonium bifluoride mixture in the first vessel. While the propylene glycol was being agitated, 30 pounds of xanthum gum was slowly added to the propylene glycol, and that agitation was continued until the xanthum gum was uniformly dispersed throughout the propylene glycol. The high shear and vortices created in the propylene glycol provided for the rapid dispersion of the xanthum gum.

While the ammonium bifluoride-water solution was being agitated at the second, lower rate, it was recirculated by a pump through a conduit from the bottom portion of the first vessel and returned to the first vessel at a higher elevation, but below the free surface of the ammonium bifluoride-water solution in the vessel to assure a homogenous mixture of the ammonium bifluoride-water solution.

As the ammonium bifluoride-water in the first vessel was being agitated and recirculated, the propylene glycol-xanthum gum mixture from the second vessel was gradually added to the first vessel. After all of the propylene glycol-xanthum gum mixture had been added to the ammonium bifluoride-water solution in the first vessel, the ammonium bifluoride, water, xantham gum, propylene glycol mixture was agitated and recirculated in the vessel until a homogenous mixture was obtained.

EXAMPLE II

The above discussed process of Example I was repeated using 5.5 gallons of water at about 80 F., 28 pounds of crystalline ammonium bifluoride, 23 pounds of propylene glycol, and 3.0 pounds of xanthum gum to produce the etching composition

EXAMPLE III

The above discussed process of Example I was repeated using 156 gallons of water at about 100 F., 550 pounds of crystaline ammonium bifluoride, 575 pounds of propylene glycol, and 75 pounds of xanthum gum to produce the etching composition.

EXAMPLE IV

The above discussed process of Example I was repeated using 156 gallons of water at about 150 F., 550 pounds of crystaline ammonium bifluoride, 575 pounds of propylene glycol and 75 pounds of xanthum gum to produce the etching composition.

EXAMPLE V

Another etching composition was produced following the process of Example I and using the constituent amounts of Example I, and also including 50 pounds of phosphoric acid mixed in the homogenous ammonium bifluoride, water, xanthum gum, propylene glycol mixture in the first vessel to adjust the pH of the mixture to 5.5.

EXAMPLE VI

Another etching composition was produced following the process of Example I and using the constituent amounts of Example II, and also including 0.5 pounds of phosphoric acid mixed in the homogenous ammonium bifluoride, water, xanthum gum, propylene glycol mixture in the first vessel to adjust the pH of the mixture to 5.0.

EXAMPLE VII

Another etching composition was produced following the process of Example I and using the constituent amounts of Example III, and also including 10 pounds of phosphoric acid mixed in the homogenous ammonium bifluoride, water, xanthum gum, propylene glycol mixture in the first vessel to adjust the pH of the mixture to 5.6.

EXAMPLE VIII

Another preferred etching composition was produced following the process of Example I and using the constituent amounts of Example IV, and also including 20 pounds of phosphoric acid mixed in the homogenous ammonium bifluoride, water, xanthum gum, propylene glycol mixture in the first vessel to adjust the pH of the mixture to 4.9.

In all of the Examples I–VIII, the composition was found to be useful in etching serial numbers on automobile window glass.

The foregoing detailed description is given primarily for clearness of understanding and no unnecessary limitations are to be understood therefrom for modifications will become obvious to those skilled in the art upon reading the disclosure and may be made without departing from the spirit of the invention and scope of the appended claims.

What is claimed:

1. An etching composition for etching glass comprising:
   from about 16% to about 30% by weight of ammonium bifluoride;
   from about 2% to about 4% by weight of xanthum gum;
   from about 45% to about 60% by weight of water; and,
   from about 20% to about 24% by weight of propylene glycol.

2. The etching composition of claim 1, further comprising less than 2% by weight of phosphoric acid.

3. The etching composition of claim 2, having a pH of about 5.0.

4. A process for making a glass etching composition comprising the steps of:
   adding ammonium bifluoride to water in a first vessel while agitating the water;
   continuing to agitate the ammonium bifluoride-water mixture until all of the ammonium bifluoride is completely dissolved in the water;
   adding xanthum gum to propylene glycol while agitating the propylene glycol in a second vessel;
   continuing to agitate the xanthum gum-propylene glycol mixture until the xanthum gum is completely dispersed;
   recirculating the ammonium bifluoride-water solution from the bottom of the first vessel to a higher elevation in the first vessel;
   agitating the ammonium bifluoride-water solution in the first vessel as the ammonium bifluoride-water solution is being recirculated;
   adding the xanthum gum-propylene glycol solution from the second vessel to the ammonium bifluoride-water solution in the first vessel while continuing to agitate and recirculate the ammonium bifluoride-water solution; and,
   continuing to agitate and recirculate the ammonium bifluoride, water, xanthum gum, propylene glycol mixture until the mixture is homogenized.

5. The process of claim 4, wherein after the ammonium bifluoride has been solubulized in the water, decreasing the amount of agitation of the ammonium bifluoride-water solution sufficient to allow encapsulated air to escape from the ammonium bifluoride-water solution.

6. The process of claim 4, wherein in the agitating of the xanthum gum and propylene glycol is performed at a higher energy level than the agitating of the ammonium bifluoride and water agitation.

7. The process of claim 4, wherein the agitating of the xanthum gum and propylene glycol creates vortexing in the xanthum gum-propylene glycol mixture.

8. The process of claim 4, comprising the further steps of adding phosphoric acid to the mixture of ammonium bifluoride, water, xanthum gum, propylene glycol.

9. The process of claim 1, comprising the further step of adjusting the temperature of the water to between about 60 F. and 100 F. before the ammonium bifluoride is added thereto.

* * * * *